US012377850B2

(12) United States Patent
Taniguchi et al.

(10) Patent No.: US 12,377,850 B2
(45) Date of Patent: Aug. 5, 2025

(54) DRIVING ASSISTANCE METHOD AND DRIVING ASSISTANCE DEVICE

(71) Applicant: Nissan Motor Co., Ltd., Yokohama (JP)

(72) Inventors: Yohei Taniguchi, Kanagawa (JP); Yuta Akamatsu, Kanagawa (JP); Takashi Fukuda, Kanagawa (JP); Hirotaka Kamimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/844,308

(22) PCT Filed: Mar. 18, 2022

(86) PCT No.: PCT/JP2022/012687
§ 371 (c)(1),
(2) Date: Sep. 5, 2024

(87) PCT Pub. No.: WO2023/175928
PCT Pub. Date: Sep. 21, 2023

(65) Prior Publication Data
US 2025/0115245 A1 Apr. 10, 2025

(51) Int. Cl.
*B60W 30/18* (2012.01)
*B60W 30/12* (2020.01)
(Continued)

(52) U.S. Cl.
CPC ...... *B60W 30/18163* (2013.01); *B60W 30/12* (2013.01); *B60W 50/08* (2013.01); *B62D 15/0255* (2013.01)

(58) Field of Classification Search
CPC ........... B60W 30/18163; B60W 30/12; B60W 50/08; B60W 2540/00; B60W 2552/00;
(Continued)

(56) References Cited

U.S. PATENT DOCUMENTS 11,097,777 B2 * 8/2021 Resch ................... B60W 50/10
11,492,015 B2 * 11/2022 Ito ....................... B60W 60/005
(Continued)

FOREIGN PATENT DOCUMENTS

CN        108995715 A   * 12/2018   ............... B60Q 9/00
JP        2021-091282 A    6/2021
(Continued)

OTHER PUBLICATIONS

WO-2023175928-A1 machine translation (Year: 2023).*
JP-2021138247-A machine translation (Year: 2021).*
CN-108995715-A machine translation (Year: 2018).*

*Primary Examiner* — Angelina M Shudy
(74) *Attorney, Agent, or Firm* — Young Basile Hanlon & MacFarlane, P.C.

(57) ABSTRACT

A driving assistance method uses a controller to perform automated lane change to control the own vehicle in such a way that the own vehicle makes a lane change under a condition that the passenger is at least in contact with the steering wheel, the driving assistance method causing the controller to perform processing including: selecting a target lane; and when automated lane change from a current lane to the target lane includes a first automated lane change from a first lane to a second lane and a second automated lane change from the second lane to a third lane, performing lane-keeping assistance under a condition that the passenger is at least in contact with the steering wheel from an end of control of the first automated lane change until a start of control of the second automated lane change.

5 Claims, 5 Drawing Sheets

(51) Int. Cl.
*B60W 50/08* (2020.01)
*B62D 15/02* (2006.01)

(58) Field of Classification Search
CPC ................. B60W 2556/50; B62D 15/0255; G08G 1/167
See application file for complete search history.

(56) References Cited

U.S. PATENT DOCUMENTS

| | | | |
|---|---|---|---|
| 11,518,414 B2 | 12/2022 | Taniguchi | |
| 11,548,508 B2* | 1/2023 | Taniguchi | B60W 30/10 |
| 11,760,356 B2* | 9/2023 | Hashimoto | B60W 30/18163 |
| | | | 701/25 |
| 12,030,500 B2 | 7/2024 | Kanoh et al. | |
| 2010/0063720 A1* | 3/2010 | Machino | G01C 21/3658 |
| | | | 701/533 |
| 2012/0123672 A1* | 5/2012 | Kojima | G01C 21/3658 |
| | | | 701/410 |
| 2016/0272202 A1* | 9/2016 | Inomata | B60W 30/12 |
| 2017/0088175 A1* | 3/2017 | Okuda | B62D 15/025 |
| 2017/0129499 A1* | 5/2017 | Odate | B60W 60/0053 |
| 2017/0320521 A1* | 11/2017 | Fujita | G01C 21/3602 |
| 2017/0341653 A1* | 11/2017 | Kubota | B60W 50/0097 |
| 2018/0053309 A1* | 2/2018 | Maani | G06T 7/251 |
| 2018/0178839 A1* | 6/2018 | Ide | B62D 15/029 |
| 2018/0194364 A1* | 7/2018 | Asakura | B60W 60/0059 |
| 2018/0211533 A1* | 7/2018 | Nakajima | G08G 1/00 |
| 2018/0345964 A1* | 12/2018 | Fujii | B60W 50/14 |
| 2019/0004514 A1* | 1/2019 | Hiwatashi | G06V 40/18 |
| 2019/0047561 A1* | 2/2019 | Nishiguchi | B60W 50/10 |
| 2019/0071099 A1* | 3/2019 | Nishiguchi | B62D 15/0255 |
| 2019/0100211 A1* | 4/2019 | Liu | B60W 60/00276 |
| 2019/0152525 A1* | 5/2019 | Resch | B62D 15/0255 |
| 2019/0263411 A1* | 8/2019 | Saikyo | G05D 1/0214 |
| 2019/0283770 A1* | 9/2019 | Kubota | B60W 50/082 |
| 2019/0308634 A1* | 10/2019 | Dakemoto | B60S 1/46 |
| 2020/0217685 A1* | 7/2020 | Koh | G01C 21/3602 |
| 2020/0255010 A1* | 8/2020 | Fujii | B60W 30/12 |
| 2020/0398868 A1* | 12/2020 | Horii | B60W 50/14 |
| 2021/0078572 A1* | 3/2021 | Kim | B60W 30/12 |
| 2021/0146954 A1* | 5/2021 | Kaji | B60W 30/143 |
| 2021/0232138 A1* | 7/2021 | Ukai | B60W 60/00186 |
| 2021/0300377 A1 | 9/2021 | Kanoh et al. | |
| 2021/0323556 A1* | 10/2021 | Matsumura | B60W 60/0015 |
| 2022/0001867 A1* | 1/2022 | Hashimoto | B60W 60/001 |
| 2022/0204054 A1 | 6/2022 | Taniguchi | |
| 2022/0234607 A1* | 7/2022 | Hata | G08G 1/16 |
| 2022/0266869 A1* | 8/2022 | Ito | B60W 60/005 |
| 2022/0348227 A1* | 11/2022 | Foster | B60Q 1/507 |
| 2023/0303100 A1* | 9/2023 | Hirosawa | B60W 30/18163 |
| 2023/0311889 A1* | 10/2023 | Kato | B60W 50/14 |
| | | | 701/26 |
| 2024/0262351 A1* | 8/2024 | Taniguchi | B60W 50/14 |
| 2024/0416916 A1* | 12/2024 | Taniguchi | B60W 30/18163 |
| 2025/0115245 A1* | 4/2025 | Taniguchi | B60W 50/08 |
| 2025/0136107 A1* | 5/2025 | Uemura | B60W 50/10 |

FOREIGN PATENT DOCUMENTS

| | | | |
|---|---|---|---|
| JP | 2021138247 A | * | 9/2021 |
| JP | 2021-160541 A | | 10/2021 |
| WO | 2020/230306 A1 | | 11/2020 |
| WO | WO-2023175928 A1 | * | 9/2023 |

* cited by examiner

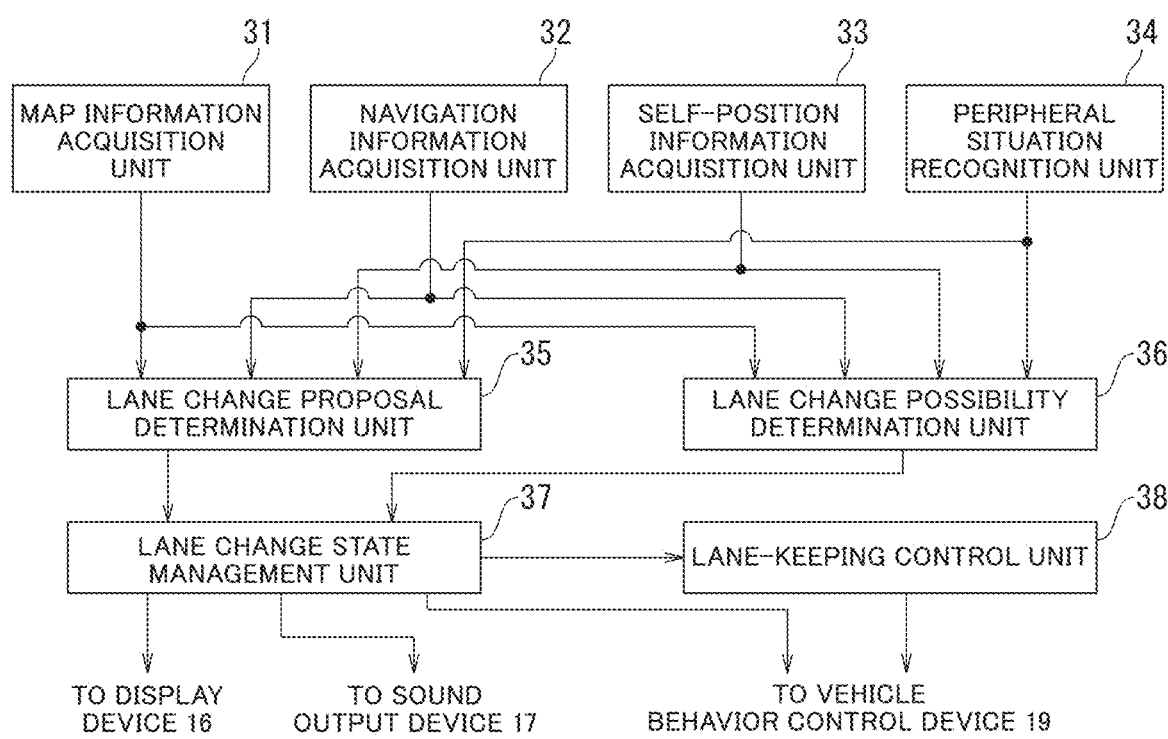

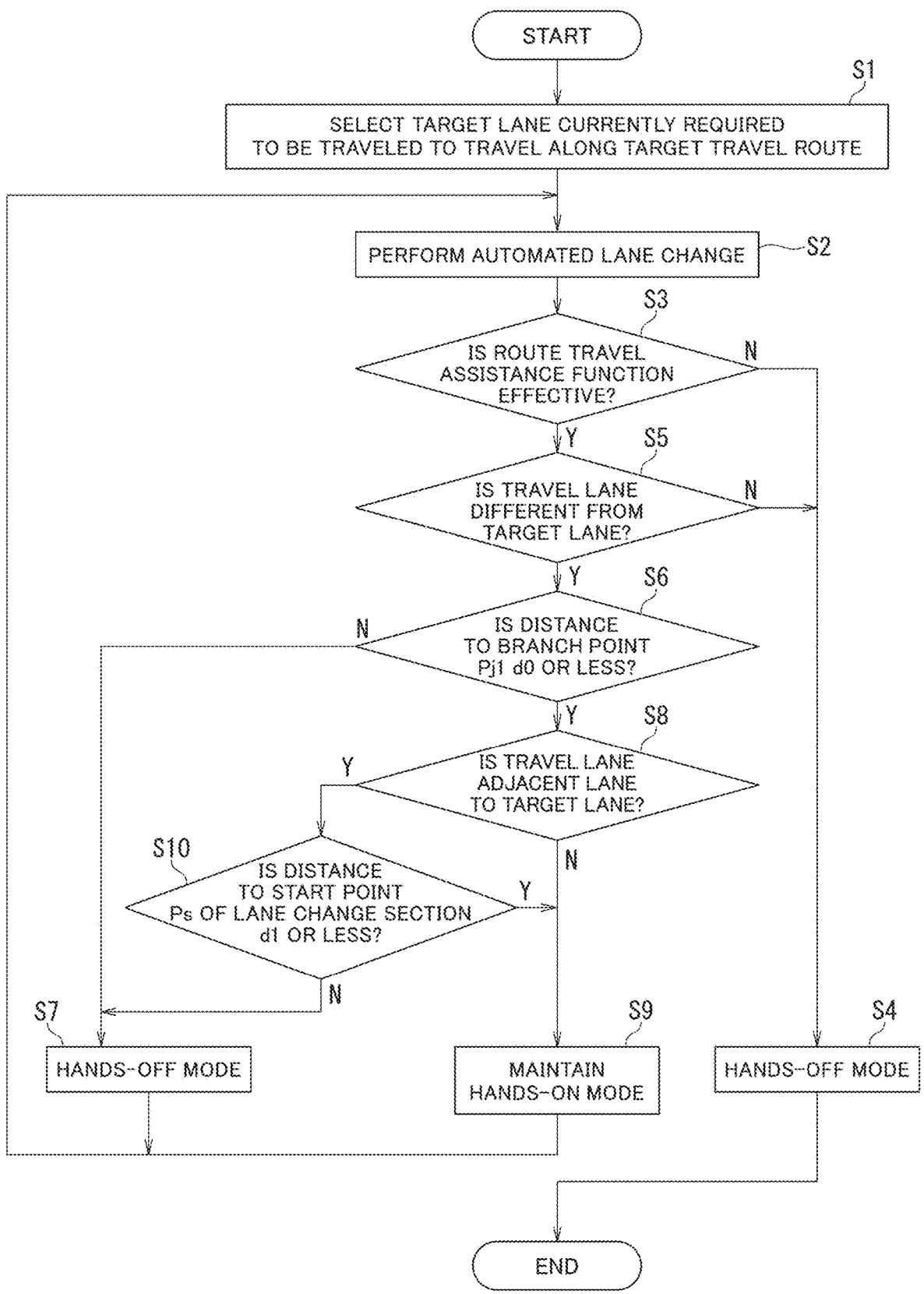

DRIVING ASSISTANCE METHOD AND DRIVING ASSISTANCE DEVICE

TECHNICAL FIELD

The present invention relates to a driving assistance method and a driving assistance device.

BACKGROUND

In JP 2021-138247 A described below, a vehicle control device that successively performs an automated lane change from a first lane to a second lane and an automated lane change from the second lane to a third lane is described.

SUMMARY

An automated lane change function to perform a lane change in an automated manner under the condition of a hands-on state in which a passenger is grasping a steering wheel (including a state in which the passenger is in contact with the steering wheel) has been known. In some cases, when in the case where a vehicle in which such an automated lane change function is installed successively performs a plurality of automated lane changes including a first automated lane change and a second automated lane change succeeding the first automated lane change, a hands-off state (a state in which the passenger is not in contact with the steering wheel) is temporarily permitted after the first automated lane change, the hands-on state is demanded again immediately after the passenger takes the hands off the steering wheel and the passenger feels inconvenience.

An object of the present invention is to eliminate inconvenience caused by, when a vehicle in which an automated lane change function performed under the condition of a hands-on state is installed successively performs a plurality of automated lane changes, a hands-on state being demanded immediately after a passenger takes the hands off a steering wheel.

According to an aspect of the present invention, there is provided a driving assistance method in which a controller performs first lane-keeping assistance to control an own vehicle in such a way that the own vehicle travels in a same lane even when a passenger is not in contact with a steering wheel and automated lane change to control the own vehicle in such a way that the own vehicle makes a lane change under a condition that the passenger is at least in contact with the steering wheel, the driving assistance method causing the controller to perform processing including: selecting a target lane in which the own vehicle is required to travel, based on a preset target route; and when automated lane change from a current lane, the current lane being a lane in which the own vehicle is currently traveling, to the target lane includes a first automated lane change from a first lane to a second lane adjacent to the first lane and a second automated lane change from the second lane to a third lane adjacent to the second lane, performing second lane-keeping assistance to control the own vehicle in such a way that the own vehicle travels in a same lane under a condition that the passenger is at least in contact with the steering wheel from an end of control of the first automated lane change until a start of control of the second automated lane change.

According to an aspect of the present invention, it is possible to eliminate inconvenience caused by, when a vehicle in which an automated lane change function performed under the condition of a hands-on state is installed successively performs a plurality of automated lane changes, a hands-on state being demanded immediately after a passenger takes the hands off a steering wheel.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 8 is a block diagram of an example of a functional configuration for performing route travel assistance control in the controller; and FIG. 9 is a flowchart of an example of a driving assistance method of the embodiment.

DETAILED DESCRIPTION (Configuration)

Figure 1:
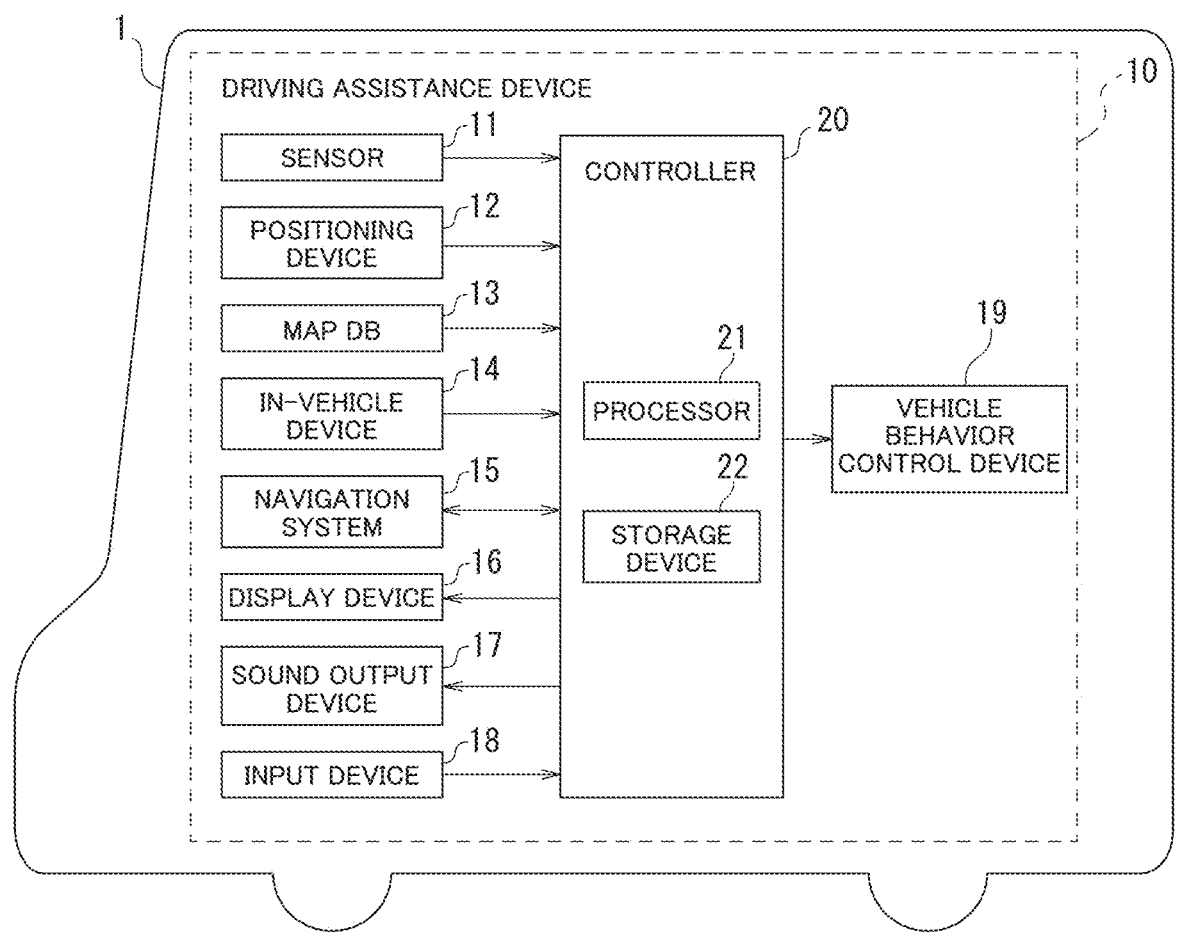
FIG. 1 is a diagram illustrative of an example of a schematic configuration of a vehicle on which a driving assistance device of an embodiment is mounted.

FIG. 1 is a diagram illustrative of an example of a schematic configuration of a vehicle on which a driving assistance device of an embodiment is mounted. A driving assistance device 10 mounted on an own vehicle 1 includes sensors 11, a positioning device 12, a map database (map DB) 13, in-vehicle devices 14, a navigation system 15, display devices 16, sound output devices 17, input devices 18, a vehicle behavior control device 19, and a controller 20. The above-described devices are connected to one another via, for example, a controller area network (CAN) or another in-vehicle LAN in order to perform transmission and reception of information with one another.

The sensors 11 detect a travel state of the own vehicle 1. For example, the sensors 11 include cameras each of which captures an image of one of the front side, the rear side, and both lateral sides of the own vehicle 1. In addition, the sensors 11 include radars each of which detects an object existing on one of the front side, the rear side, and both lateral sides of the own vehicle 1. The sensors 11 include a vehicle speed sensor to detect vehicle speed of the own vehicle 1, a touch sensor to detect whether or not a passenger holds a steering wheel, a passenger monitor to capture an image of the passenger, and the like. The positioning device 12 includes a GPS unit, a gyro sensor, and the like. The positioning device 12 periodically acquires position information of the own vehicle 1 by the GPS unit. In addition, the positioning device 12 detects a current position of the own vehicle 1, based on the position information of the own vehicle 1, angle change information acquired from the gyro sensor, and vehicle speed acquired from the vehicle speed sensor.

The map database 13 is a memory that stores three-dimensional high-definition map information including position information of various types of facilities and specific points and that is configured to be accessible from the controller 20. The three-dimensional high-definition map information is map information in which detailed and highly precise position information of a curved road and the amount of curvature (for example, curvature or radius of curvature) thereof, a junction of roads, a branch point, a tollgate, a point of reduction in the number of lanes, and the like is associated with the map information as three-dimensional information.

The in-vehicle devices 14 are various types of devices mounted on the own vehicle 1 and operate in accordance with operation performed by a passenger (for example, a driver). Examples of such in-vehicle devices include a steering wheel, an accelerator pedal, a brake pedal, turn signals, windshield wipers, lights, a horn, other specific switches, and the like.

The navigation system 15 acquires current position information of the own vehicle 1 from the positioning device 12 and, by superimposing the position of the own vehicle 1 on map information for navigation, displays the current position on a display or the like. In addition, the navigation system 15 performs navigation control to, when a destination is set, set a route from the current position of the own vehicle 1 to the destination as a target travel route and guide the passenger along the target travel route. In the navigation control, the navigation system 15 displays the target travel route on a map on the display and informs the passenger of the target travel route by voice or the like. The target travel route set by the navigation system 15 is also used in route travel assistance control performed by the controller 20. The route travel assistance control is control to cause the own vehicle 1 to autonomously travel along the target travel route.

The display devices 16 include various types of displays that are installed at positions at which the passenger can visually recognize the displays. The display devices 16 notify the passenger of various types of presented information in accordance with control performed by the controller 20. The sound output devices 17 are devices to output acoustic information, such as a speaker that the navigation system 15 includes, a speaker of an audio device, and a buzzer. The sound output devices 17 notify the passenger of various types of presented information in accordance with control performed by the controller 20.

The input devices 18 are devices, such as a button switch that enables the passenger to input an operation by manual operation, a touch panel arranged on a display screen, and a microphone that enables the passenger to input an operation by voice. The passenger can input setting information in response to the presented information presented by a display device 16 or a sound output device 17 by operating an input device 18.

Figure 2:
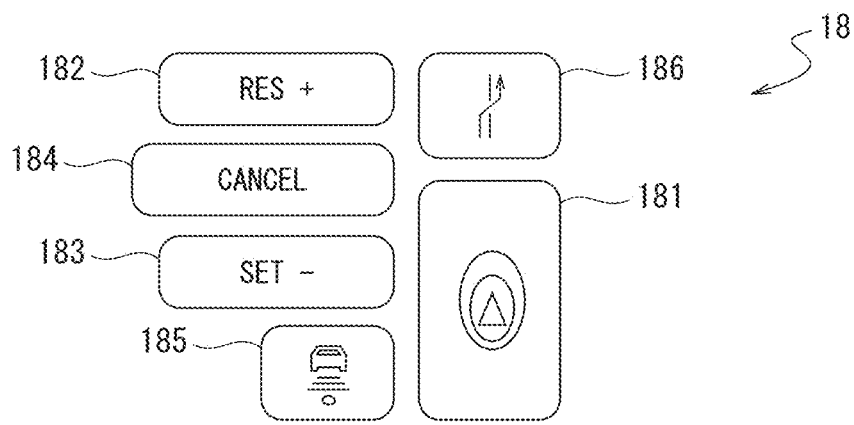
FIG. 2 is a diagram illustrative of some of input devices in FIG. 1.

FIG. 2 is a diagram illustrative of some of the input devices 18 of the present embodiment. The input devices 18 may be a button switch group that is arranged on, for example, a spoke of the steering wheel. The input devices 18 are used when turning-on and -off and the like of autonomous travel control performed by the controller 20 are set. The input devices 18 include a main switch 181, a resume/accelerate switch 182, a set/coast switch 183, a cancel switch 184, an inter-vehicle distance adjustment switch 185, and a lane change assistance switch 186. The main switch 181 is a switch to turn on and off the autonomous travel control performed by the controller 20. The resume/accelerate switch 182 is a switch to, after the autonomous travel control is turned off, set resumption of the autonomous travel control at a set speed before the turning-off of the autonomous travel control or to increase the set speed. The set/coast switch 183 is a switch to start the autonomous travel control. In order to start the autonomous travel control, after the autonomous travel control is turned on by the main switch 181, the set/coast switch 183 is pressed. The set/coast switch 183 is also a switch to reduce the set speed. The cancel switch 184 is a switch to cancel the autonomous travel control. The inter-vehicle distance adjustment switch 185 is a switch to set an inter-vehicle distance to a preceding vehicle. The lane change assistance switch 186 is a switch to, when the controller 20 confirms start of a lane change to the passenger, instruct (approve) the start of the lane change. Note that, in addition to the button switch group illustrated in FIG. 2, a turn signal lever to turn on a turn signal and switches of other in-vehicle devices 14 can be used as the input devices 18.

The vehicle behavior control device 19 controls vehicle behavior of the own vehicle 1. For example, when the own vehicle 1 performs constant speed travel at a set speed by the autonomous travel control, the vehicle behavior control device 19 controls operation of a drive mechanism and brake operation to achieve acceleration/deceleration and travel speed that enable the own vehicle 1 to travel at the set speed. In addition, when the own vehicle 1 travels following a preceding vehicle by the autonomous travel control, the vehicle behavior control device 19 also likewise controls the operation of the drive mechanism and the brake. Note that the operation control of the drive mechanism includes operation of an internal-combustion engine in the case of an engine-driven vehicle and operation of a motor for traveling in the case of an electric vehicle. In addition, the operation control of the drive mechanism includes torque distribution between an internal-combustion engine and a motor for traveling in the case of a hybrid vehicle.

In addition, when the vehicle behavior control device 19 performs autonomous steering control, which will be described later, by the autonomous travel control, the vehicle behavior control device 19 performs steering control of the own vehicle 1 by controlling operation of a steering actuator in addition to the operation control of the drive mechanism and the brake.

The controller 20 is one or a plurality of electronic control units (ECUs) for controlling travel of the own vehicle 1 and includes a processor 21 and peripheral components, such as a storage device 22. The processor 21 may be, for example, a CPU or an MPU. The storage device 22 may include a semiconductor storage device, a magnetic storage device, an optical storage device, or the like. The storage device 22 may include registers, a cache memory, and a memory, such as a ROM and a RAM, that is used as a main storage device. Functions of the controller 20, which will be described below, are achieved by, for example, the processor 21 executing computer programs stored in the storage device 22.

The controller 20 achieves a travel information acquisition function to acquire information relating to a travel state of the own vehicle 1 and performs autonomous travel control to autonomously control travel speed and/or steering of the own vehicle 1. The travel information acquisition function is a function to acquire travel information relating to a travel state of the own vehicle 1. For example, the controller 20 acquires, as the travel information, image information of the outside of the vehicle captured by the cameras in the sensors 11, a detection result by the radars therein, and vehicle speed information from the vehicle speed sensor therein.

Further, the controller 20 acquires, as the travel information, the current position information of the own vehicle 1 from the positioning device 12. The controller 20 acquires, as the travel information, a set destination and a target travel route to the destination from the navigation system 15. The controller 20 acquires, as the travel information, map information, such as position information of a curved road and the amount of curvature (for example, curvature or radius of curvature) thereof, a junction of roads, a branch point, a tollgate, a point of reduction in the number of lanes, and the like and lane information, from the map database 13. The controller 20 acquires, as the travel information, information about operation of the in-vehicle devices 14 performed by the passenger from the in-vehicle devices 14.

In the autonomous travel control, the controller 20 autonomously controls travel of the own vehicle 1 without depending on operation performed by the passenger. The autonomous travel control includes autonomous speed control to autonomously control travel speed of the own vehicle 1 and autonomous steering control to autonomously control steering of the own vehicle 1.

In the autonomous speed control, when the controller 20 is detecting a preceding vehicle, the controller 20 controls the own vehicle 1 to travel following the preceding vehicle while performing inter-vehicle distance control in such a way as to keep inter-vehicle distance depending on vehicle speed, with a vehicle speed set by the passenger or a speed limit as an upper limit. In contrast, when the controller 20 is not detecting a preceding vehicle, the controller 20 controls the own vehicle 1 to perform constant speed travel at the vehicle speed set by the passenger or the speed limit. The former and the latter are also referred to as inter-vehicle distance control and constant speed control, respectively.

The constant speed control is performed when it is detected by a front view radar or the like in the sensors 11 that no preceding vehicle exists ahead of the own vehicle 1 in a lane in which the own vehicle 1 is traveling. In the constant speed control, the controller 20 controls operation of the drive mechanism, such as the engine and the brake, by the vehicle behavior control device 19 while feeding back vehicle speed data detected by the vehicle speed sensor in such a manner that the own vehicle 1 maintains a set travel speed. The inter-vehicle distance control is performed when it is detected by the front view radar or the like in the sensors 11 that a preceding vehicle exists ahead of the own vehicle 1 in the lane in which the own vehicle 1 is traveling. In the inter-vehicle distance control, the controller 20 controls operation of the drive mechanism, such as the engine and the brake, by the vehicle behavior control device 19 while feeding back inter-vehicle distance data detected by the front view radar in such a manner that the own vehicle 1 maintains a set inter-vehicle distance with the set travel speed as an upper limit.

In the autonomous steering control, the controller 20 performs the steering control of the own vehicle 1 by controlling operation of the steering actuator, based on the travel information acquired by the travel information acquisition function. The autonomous steering control includes lane-keeping control, lane change assistance control, passing assistance control, and the route travel assistance control.

In the lane-keeping control, the controller 20 assists steering wheel operation performed by the passenger by controlling the steering actuator in such a way that, for example, the own vehicle 1 travels substantially along the center of a lane.

In the lane change assistance control, when the passenger operates the turn signal lever, the controller 20 turns on a turn signal and determines whether or not a predetermined lane change start condition is established, based on various types of travel information acquired by the travel information acquisition function. The controller 20 starts the lane change operation when the lane change start condition is satisfied.

In the lane change operation, the controller 20 performs lane change manipulation to cause the own vehicle 1 to laterally move to an adjacent lane that is a lane change destination (hereinafter, sometimes referred to as "destination lane"). While the controller 20 is performing the lane change operation, the controller 20 presents information indicating that the own vehicle 1 is automatically making a lane change, by a display device 16. When the lane change manipulation is finished, the controller 20 turns off the turn signal and starts performance of a lane-keeping function in the lane after lane change. The lane change manipulation is finished when, for example, the own vehicle 1 reaches within a predetermined distance from a lane center of the lane after lane change.

In the passing assistance control, when the controller 20 detects a preceding vehicle that is slower than the own vehicle 1 ahead of the own vehicle 1 in the lane in which the own vehicle 1 is traveling and a predetermined passing proposal condition is satisfied, the controller 20 proposes making a lane change by the autonomous travel control and passing the preceding vehicle, to the passenger. Hereinafter, a proposal to make a lane change to pass a preceding vehicle is sometimes referred to as "passing proposal". When the passenger approves the passing proposal by operating the lane change assistance switch 186 in the input devices 18 in response to the presentation of the passing proposal and a predetermined passing execution condition is satisfied, the controller 20 performs automated lane change. In the automated lane change, the controller 20 performs the lane change operation in such a way that the own vehicle 1 moves to the destination lane.

Further, when after the own vehicle 1 has passed the preceding vehicle, a predetermined lane return proposal condition is satisfied, the controller 20 proposes making a lane change by the autonomous travel control and returning to an original lane before the passing of the preceding vehicle, to the passenger by a display device 16. Hereinafter, a proposal of a lane change to return to the original lane after passing a preceding vehicle is sometimes referred to as "lane return proposal". When the passenger approves the lane return proposal by operating the lane change assistance switch 186 in the input devices 18 in response to the presentation of the lane return proposal and a predetermined lane return execution condition is satisfied, the controller 20 performs the automated lane change. In the automated lane change, the controller 20 performs the lane change operation in such a way that the own vehicle 1 moves to the original lane. Hereinafter, a function of the controller 20 to perform the passing assistance control is sometimes referred to as "passing assistance function".

In the route travel assistance control, when a predetermined route travel proposal condition is satisfied at a point a predetermined distance d0 before a travel direction change point, such as a branch point, a junction, an exit, and a tollgate, that exists on the target travel route set by the navigation system 15, the controller 20 proposes making a lane change by the autonomous travel control to cause the own vehicle 1 to travel along the target travel route, to the passenger. Hereinafter, a proposal to make a lane change to cause the own vehicle 1 to travel along the target travel route is sometimes referred to as "route travel proposal". When the passenger approves the route travel proposal by operating the lane change assistance switch 186 in the input devices 18 in response to the presentation of the route travel proposal and the predetermined route travel execution condition is satisfied, the controller 20 performs the automated lane change. In the automated lane change, the controller 20 performs the lane change operation in such a way that the own vehicle 1 moves to the destination lane. Hereinafter, a function of the controller 20 to perform the route travel assistance control is sometimes referred to as "route travel assistance function".

Figure 3:
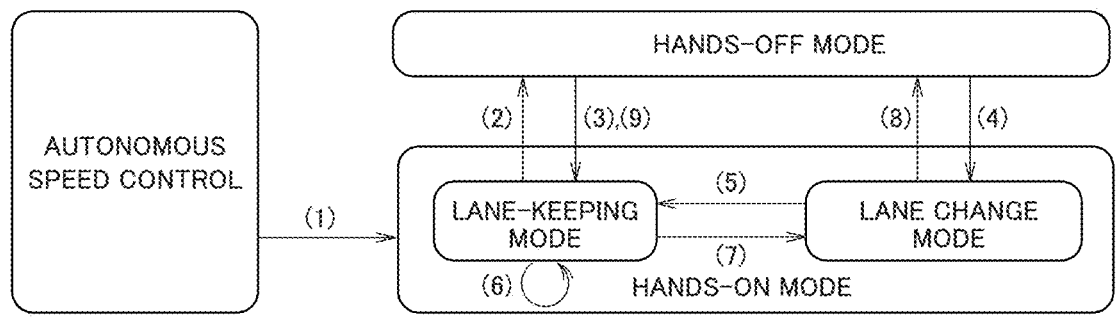
FIG. 3 is an example of a state transition diagram of operation modes of a controller.

FIG. 3 is an example of a state transition diagram of operation modes of the controller 20 (hereinafter, simply referred to as "operation modes"). When the main switch 181 is operated from an off state to an on state, the autonomous travel control is brought into a standby state, and by further turning on the set/coast switch 183 or the resume/accelerate switch 182 while the autonomous travel control is in the standby state, the autonomous speed control is started. This operation causes the above-described constant speed control or inter-vehicle distance control to be started.

When a condition (1) is established while the autonomous speed control is performed, the operation mode transitions to a lane-keeping mode in a hands-on mode. The hands-on mode is an operation mode in which the controller 20 performs the autonomous steering control under the condition that the passenger is at least in contact with the steering wheel. In the hands-on mode, the autonomous steering control is not actuated unless the passenger is at least in contact with the steering wheel. Alternatively, when contact of the passenger with the steering wheel becomes undetectable while the autonomous steering control is in operation, the autonomous steering control is stopped or suspended. Whether or not the passenger is in contact with the steering wheel may be determined based on, for example, whether or not contact is detected at a portion or a plurality of points of the touch sensor in the sensors 11 that is installed on the steering wheel. Alternatively, the hands-on mode may be an operation mode in which the controller 20 performs the autonomous steering control under the condition that the passenger is grasping the steering wheel. Whether or not the passenger is grasping the steering wheel may be determined based on whether or not a pressure sensor installed on the steering wheel detects a value greater than or equal to a predetermined value. In addition, the lane-keeping mode is an operation mode in which the controller 20 performs the lane-keeping control. The lane-keeping control performed in the lane-keeping mode in the hands-on mode is an example of "second lane-keeping assistance" described in the claims.

For example, the condition (1) may be a condition requiring that all conditions exemplified below are established.

Lane markers on both sides of the own vehicle 1 are detected.

The passenger is holding the steering wheel.

The own vehicle 1 is traveling substantially along the center of a lane.

No turn signal is operated.

When a condition (2) is established in the lane-keeping mode in the hands-on mode, the operation mode transitions to a hands-off mode. The hands-off mode is an operation mode in which the controller 20 performs the lane-keeping control even when the passenger takes the hands off the steering wheel (that is, even when the passenger is not in contact with the steering wheel). The lane-keeping control performed in the hands-off mode is an example of "first lane-keeping assistance" described in the claims.

For example, the condition (2) may be a condition requiring that all conditions exemplified below are established.

The own vehicle 1 is traveling on an expressway.

The high-definition map is available.

GPS signals are effective.

The passenger is holding the steering wheel.

When a condition (3) is established in the hands-off mode, the operation mode transitions to the lane-keeping mode in the hands-on mode.

For example, the condition (3) may be a condition requiring that one of conditions exemplified below is established.

The own vehicle 1 is traveling on a road other than an expressway.

The high-definition map is not available.

No GPS signal can be received.

When a condition (4) is established in the hands-off mode, the operation mode transitions to a lane change mode in the hands-on mode. The lane change mode is an operation mode in which the controller 20 performs the lane change assistance control, the passing assistance control, or the route travel assistance control. That is, the controller 20 performs the automated lane change under the condition that the passenger is at least in contact with the steering wheel. In the hands-on mode in the lane change mode, a threshold value for determining whether or not the passenger is in contact with the steering wheel may be set to a lower value than in the hands-on mode in the lane-keeping mode.

For example, the condition (4) may be a condition requiring that one of conditions exemplified below is established.

The controller 20 has presented a passing proposal, a lane return proposal, or a route travel proposal, and the passenger has operated the lane change assistance switch 186.

The passenger has operated the turn signal lever.

When a condition (5) is established in the lane change mode in the hands-on mode, the operation mode transitions to the lane-keeping mode in the hands-on mode.

For example, the condition (5) may be a condition requiring that one of conditions exemplified below is established.

The controller 20 has not been able to start the lane change operation within a predetermined time after the passenger operated the lane change assistance switch 186 in response to presentation of a passing proposal or a lane return proposal.

The controller 20 has not been able to start the lane change operation after the passenger operated the lane change assistance switch 186 in response to presentation of a route travel proposal and the own vehicle 1 has come too close to a branch point.

The lane change operation is finished.

Thus, when the lane change operation is finished in the automated lane change, the operation mode transitions to the lane-keeping mode in the hands-on mode. When the condition (2) is established in the lane-keeping mode in the hands-on mode, the operation mode transitions to the hands-off mode. As a result, the passenger is able to use lane-keeping assistance performed by the controller 20 even when the passenger takes the hands off the steering wheel.

Note that other conditions (6) to (9) illustrated in FIG. 3 will be described later.

In the automated lane change by the route travel assistance control, there are some cases where when a lane in which the own vehicle 1 is currently required to travel (hereinafter, sometimes referred to as "target lane") to travel along the target travel route set by the navigation system 15 is set, one or more other lanes are interposed between a lane in which the own vehicle 1 is currently traveling (hereinafter, referred to as "current lane") and the target lane and the automated lane changes are successively performed across a plurality of lanes from the current lane to the target lane. In the following description, the automated lane changes across a plurality of lanes are sometimes referred to as "a plurality of automated lane changes").

Figure 4:
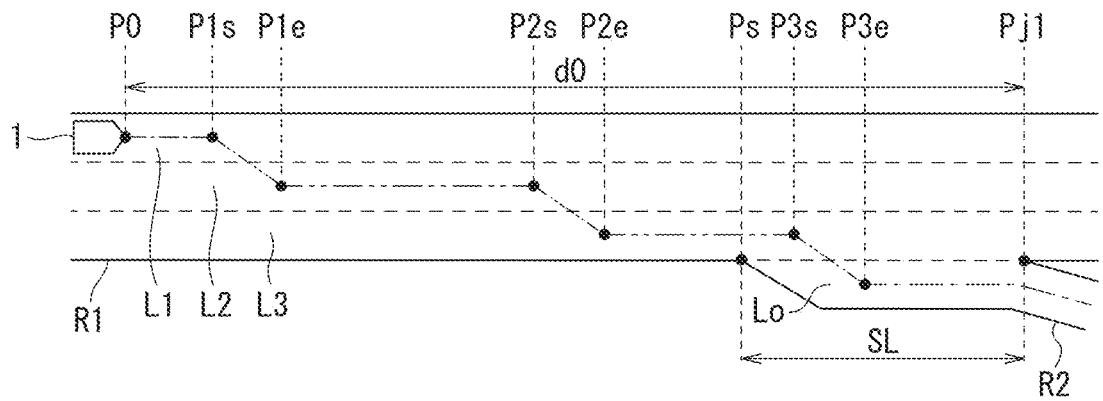
FIG. 4 is an explanatory diagram of automated lane change performed by the driving assistance device of the embodiment.

With reference to FIG. 4, a situation in which a plurality of automated lane changes are successively performed from a current lane to a target lane is exemplified. A first road R1 on which the own vehicle 1 is currently traveling includes lanes L1, L2, and L3. The lane L1 is a current lane in which the own vehicle 1 is currently traveling. For example, the first road R1 may be a main road. A second road R2 branches off from the first road R1 at a branch point Pj1, and an exit lane Lo that exits to the second road R2 branches off from the lane L3 on the first road R1. For example, the second road R2 may be a branch road.

A lane change section SL is a section between the lane L3 and the exit lane Lo in which lane change can be made. The lane change section SL starts at a start point Ps at which the exit lane Lo emerges and ends at the branch point Pj1 at which the first road R1 and the second road R2 are physically separated from each other or lane change between the lane L3 and the exit lane Lo becomes unable to be made due to some structure (a wall or a median strip) between the first road R1 and the second road R2.

For example, a case is assumed where the navigation system 15 sets a target travel route that exits from the first road R1 to the second road R2. In the route travel assistance control, the exit lane Lo is set as a target lane. When the own vehicle 1 reaches a point P0 the predetermined distance d0 before the branch point Pj1, which is a travel direction change point, the controller 20 presents a route travel proposal to the passenger. When the passenger approves the route travel proposal, a first automated lane change from the current lane L1 to the lane L2, a second automated lane change from the lane L2 to the lane L3, and a third automated lane change from the lane L3 to the target lane Lo are successively performed.

In this case, when, for example, immediately after the hands-off mode is started after the first automated lane change and the passenger takes the hands off the steering wheel, a hands-on state for the second automated lane change is demanded, the passenger sometimes feels inconvenience. The same applies to the second and later automated lane change.

Thus, when the automated lane change from the current lane L1 to the target lane Lo requires a first automated lane change from a first lane to a second lane adjacent to the first lane and a second automated lane change from the second lane to a third lane adjacent to the second lane, the controller 20 operates in the lane-keeping mode in the hands-on mode from an end of control of the first automated lane change until a start of control of the second automated lane change. Since because of this configuration, there is no possibility that the passenger takes the hands off the steering wheel between the first automated lane change and the second automated lane change, inconvenience due to the hands-on state being demanded for the second automated lane change immediately after the passenger takes the hands off the steering wheel can be eliminated.

In FIG. 4, dashed-dotted lines and dashed-two-dotted lines schematically illustrate a travel trajectory of the own vehicle 1 when the controller 20 performs the automated lane changes from the current lane L1 to the target lane Lo.

Points P1s, P2s, and P3s indicate start points of the control of the first to third automated lane changes, respectively. The control of each of the automated lane changes may, for example, be started when a predetermined route travel execution condition is satisfied. Points P1e, P2e, and P3e indicate end points of the control of the first to third automated lane changes, respectively. Timing at which the control of each of the automated lane changes ends may be when, for example, distance between a lane center of a travel lane after the lane change and the own vehicle 1 is less than or equal to a predetermined distance. During a period from when the control of each of the automated lane change ends until the control of the next automated lane change starts (in the example in FIG. 4, a section between the end point P1e and the start point P2s and a section between the end point P2e and the start point P3s), the lane-keeping control is performed.

Each of the dashed-dotted lines schematically indicates a travel trajectory in a period during which the controller 20 operates in the hands-off mode, and the dashed-two-dotted line schematically indicates a travel trajectory in a period during which the controller 20 operates in the hands-on mode. The controller 20 maintains the hands-on mode from the start point P1s of the control of the first automated lane change to the end point P3e of the control of the third automated lane change. Therefore, the controller 20 operates in the lane-keeping mode in the hands-on mode between the end point P1e of the control of the first automated lane change and the start point P2s of the control of the second automated lane change and between the end point P2e of the control of the second automated lane change and the start point P3s of the control of the third automated lane change. When the own vehicle 1 reaches the target lane Lo and the control of the third automated lane change ends at the end point P3e, the controller 20 starts the hands-off mode.

Figure 5:
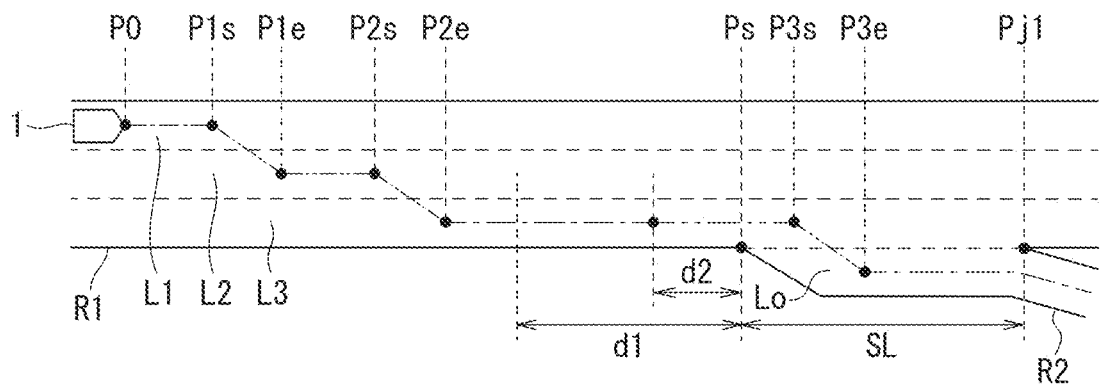
FIG. 5 is another explanatory diagram of the automated lane change performed by the driving assistance device of the embodiment.

FIG. 5 is now referred to. When in the route travel assistance control, the route travel proposal is approved, the controller 20 may rapidly complete the automated lane changes up to the lane L3 on the first road R1, which branches off to the exit lane Lo, as much as possible. This is because such control enables the own vehicle 1 to travel along the target travel route more securely. Thus, travel distance after the second automated lane change from the lane L2 to the lane L3 ends until the third automated lane change from the lane L3 to the exit lane Lo is started sometimes becomes long. In this case, it is preferable to cause the controller 20 to operate in the hands-off mode and reduce a burden on the passenger.

Thus, when the control of the automated lane change from the lane L2 to the lane L3 ends at a point a predetermined distance d1 or more before the start point Ps, at which the exit lane Lo branches off from the lane L3, the controller 20 may perform the lane-keeping control in the hands-off mode after the control of the automated lane change from the lane L2 to the lane L3 ends. In this case, the controller 20 may perform the automated lane change from the lane L3 to the exit lane Lo after causing the operation mode to transition to the lane change mode in the hands-on mode at a point a predetermined distance d2 before the start point Ps.

Figure 6:
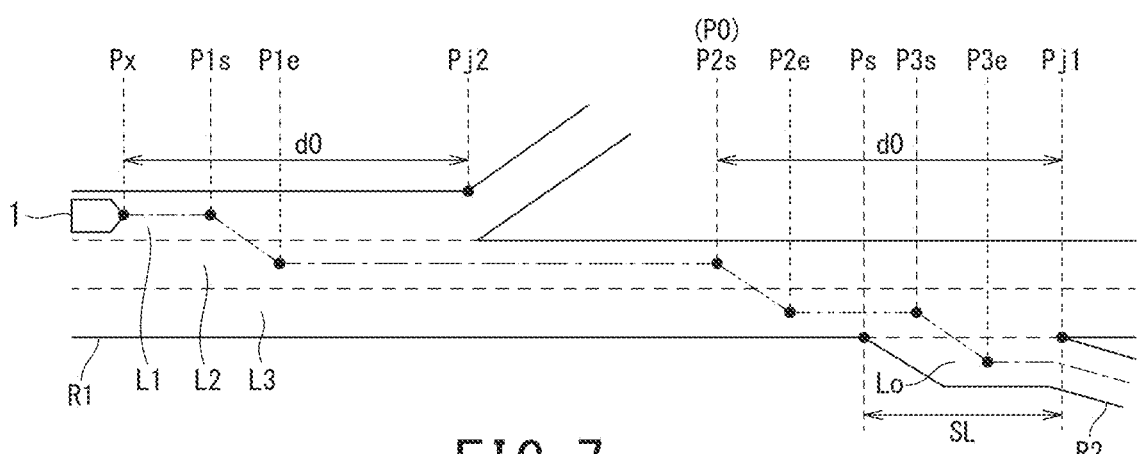
FIG. 6 is still another explanatory diagram of the automated lane change performed by the driving assistance device of the embodiment.

FIG. 6 is now referred to. In some cases, the current lane L1 branches off from the main road at a branch point Pj2 before the own vehicle 1 reaches a point the predetermined distance d0 before the branch point Pj1. In this case, the route travel assistance control presents a route travel proposal at a point Px the predetermined distance d0 before the branch point Pj2. As a result, distance between the end point P1e of the control of the first automated lane change from the current lane L1 to the lane L2 and the branch point Pj1 is sometimes longer than the predetermined distance d0. In this case, travel distance after the first automated lane change to the lane L2 ends until the second automated lane change from the lane L2 to the lane L3 is started sometimes becomes long. In this case, it is preferable to cause the controller 20 to operate in the hands-off mode and reduce a burden on the passenger.

Thus, when distance between the end point P1e of the control of the first automated lane change from the current lane L1 to the lane L2 and the branch point Pj1 is longer than the predetermined distance d0, the controller 20 may perform the lane-keeping control in the hands-off mode after the control of the automated lane change from the current lane L1 to the lane L2 ends. In this case, the controller 20 may start the control of the automated lane change from the lane L2 to the lane L3 at the point P0 the predetermined distance d0 before the branch point Pj1.

Figure 7:
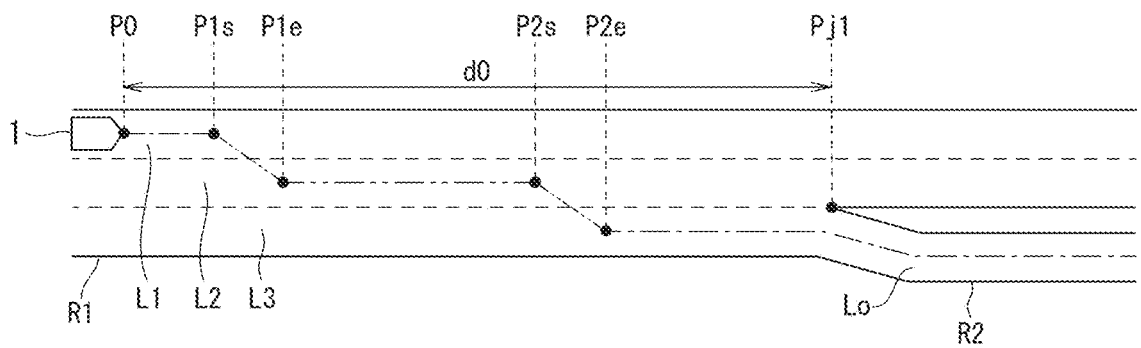
FIG. 7 is yet another explanatory diagram of the automated lane change performed by the driving assistance device of the embodiment.

FIG. 7 is now referred to. In some cases, the lane L3 on the first road R1 branches off from the first road R1 and changes to the exit lane Lo to the second road. In this case, when the second automated lane change from the lane L2 to the lane L3 ends, the own vehicle 1 reaches the target lane Lo and a plurality of automated lane changes from the current lane L1 to the target lane Lo are completed. Thus, when the second automated lane change ends, the controller 20 causes the operation mode to transition to the hands-off mode.

FIG. 8 is a block diagram of an example of a functional configuration for performing the route travel assistance control in the controller 20. The controller 20 includes a map information acquisition unit 31, a navigation information acquisition unit 32, a self-position information acquisition unit 33, a peripheral situation recognition unit 34, a lane change proposal determination unit 35, a lane change possibility determination unit 36, a lane change state management unit 37, and a lane-keeping control unit 38.

The map information acquisition unit 31 acquires map information from the map database 13 or by a not-illustrated communication device. The navigation information acquisition unit 32 acquires route information relating to a target travel route to a destination from the navigation system 15. The self-position information acquisition unit 33 acquires current position information relating to the current position of the own vehicle 1 from the positioning device 12. The peripheral situation recognition unit 34 recognizes a situation in the surroundings of the own vehicle 1 (for example, other vehicles and white lines), based on the travel information. In particular, the peripheral situation recognition unit 34 recognizes distance d in a lane extension direction between another vehicle in a destination lane and the own vehicle 1. For example, the distance d may be inter-vehicle distance or inter-vehicle time between the another vehicle and the own vehicle 1 in the lane extension direction.

The lane change proposal determination unit 35 selects a target lane when the own vehicle 1 reaches the point P0 the predetermined distance d0 before a travel direction change point for the own vehicle 1 to travel along a target travel route. The lane change proposal determination unit 35 determines whether or not the route travel proposal condition is satisfied. For example, the route travel proposal condition may include the following conditions.

The route travel assistance function is effective.

The lane in which the own vehicle 1 is currently traveling and the target lane are different from each other.

A lane change to the target lane can be made (for example, a lane marking does not prohibit lane change, radius of curvature of the road is greater than or equal to a threshold value, and the like).

When the route travel proposal condition is satisfied, the lane change proposal determination unit 35 sets a proposal point that is a point at which a route travel proposal is presented. When the own vehicle 1 reaches the proposal point, the lane change proposal determination unit 35 outputs a route travel proposal request to the lane change state management unit 37.

When the lane change proposal determination unit 35 outputs a route travel proposal request, the lane change state management unit 37 outputs route travel information for presenting a route travel proposal to the passenger, by a display device 16 or a sound output device 17.

When the lane change state management unit 37 presents the route travel proposal, the lane change possibility determination unit 36 determines whether or not a predetermined route travel execution condition is established. For example, the route travel execution condition may include the following conditions.

The route travel assistance function is effective.

The lane in which the own vehicle 1 is currently traveling and the target lane are different from each other.

The distance d in the lane extension direction between another vehicle in the destination lane and the own vehicle 1 is greater than or equal to a distance threshold value Dp.

Lane change to the target lane side can be made.

When the route travel execution condition is satisfied, the lane change state management unit 37 turns on a turn signal and performs the lane change operation. In addition, under the condition that the route travel execution condition is satisfied, the lane change state management unit 37 starts the lane change operation in such a way that the own vehicle 1 moves to the destination lane.

The lane-keeping control unit 38 performs the lane-keeping control and controls the own vehicle 1 in such a way that the own vehicle 1 travels in the same lane. The lane-keeping control unit 38 may control the steering actuator or may provide a driving force difference or a braking force difference between a left wheel and a right wheel, in such a way that, for example, the own vehicle 1 travels substantially along the center of the lane.

When the control of, of the first automated lane change from the first lane to the second lane adjacent to the first lane and the second automated lane change from the second lane to the third lane adjacent to the second lane, which are successively performed in the route travel assistance control, the first automated lane change ends (that is, the lane change operation is finished), the lane-keeping control unit 38 determines whether or not a condition (6) is established. For example, the condition (6) may be a condition requiring that all conditions exemplified below are established.

Distance between the end point of the control of the first automated lane change and the branch point Pj1 is less than or equal to the predetermined distance d0.

A travel lane after the first automated lane change is not an adjacent lane to the target lane or distance from the end point of the control of the first automated lane change to the start point Ps of the lane change section SL is less than or equal to d1.

When all the conditions in the condition (6) are established, the lane-keeping control unit 38 maintains the lane-keeping mode in the hands-on mode.

When a condition (7) is established while the lane-keeping mode in the hands-on mode is maintained after the control of the first automated lane change ends, the lane change state management unit 37 turns on a turn signal and starts the control of the second automated lane change (that is, starts the lane change operation). The condition (7) may be the route travel execution condition.

In addition, when the control of the first automated lane change ends, the lane-keeping control unit 38 determines whether or not a condition (8) is established. For example, the condition (8) may be a condition requiring that one of conditions exemplified below is established.

Distance between the end point of the control of the first automated lane change and the branch point Pj1 is not less than or equal to the predetermined distance d0.

The travel lane after the first automated lane change is an adjacent lane to the target lane and the distance from the end point of the control of the first automated lane change to the start point Ps of the lane change section SL is longer than d1.

When all the conditions in the condition (8) are established, the lane-keeping control unit 38 causes the operation mode to transition to the hands-off mode.

When the travel lane after the first automated lane change is an adjacent lane to the target lane and the controller 20 is operating in the hands-off mode, the lane-keeping control unit 38 determines whether or not a condition (9) is established when the control of the first automated lane change ends. For example, the condition (9) may be a condition exemplified below.

The own vehicle 1 has reached a point the predetermined distance d2 before the start point Ps of the lane change section SL.

When the condition (9) is established, the lane-keeping control unit 38 causes the operation mode to transition to the lane-keeping mode in the hands-on mode.

When all the control of a plurality of automated lane changes from the current lane L1 to the target lane Lo ends, the lane-keeping control unit 38 causes the operation mode to transition to the lane-keeping mode in the hands-on mode. When the condition (2) is established, the lane-keeping control unit 38 causes the operation mode to transition to the hands-off mode.

The vehicle behavior control device 19 performs steering control of the own vehicle 1 by controlling operation of the steering actuator, based on commands from the lane change state management unit 37 and the lane-keeping control unit 38.

FIG. 9 is a flowchart of an example of a driving assistance method of the embodiment. In step S1, the lane change proposal determination unit 35 selects a target lane in which the own vehicle 1 is currently required to travel to travel along a target travel route.

In step S2, the lane change state management unit 37 performs a single automated lane change.

In step S3, the lane change proposal determination unit 35 determines whether or not the route travel assistance function is effective. When the route travel assistance function is effective (step S3: Y), the process proceeds to step S5. When the route travel assistance function is not effective (step S3: N), the process proceeds to step S4.

In step S4, the lane-keeping control unit 38 causes the operation mode to transition to the hands-off mode. Subsequently, the process terminates.

In step S5, the lane change proposal determination unit 35 determines whether or not the own vehicle 1 has reached the target lane. When the own vehicle 1 has not reached the target lane (that is, a travel lane in which the own vehicle 1 is currently traveling is not the target lane) (step S5: Y), the process proceeds to step S6. When the own vehicle 1 has reached the target lane (step S5: N), the process proceeds to step S4.

In step S6, the lane-keeping control unit 38 determines whether or not distance between the end point of the control of the automated lane change in step S2 and the branch point Pj1 is less than or equal to the predetermined distance d0. When the distance between the end point and the branch point Pj1 is less than or equal to the predetermined distance d0 (step S6: Y), the process proceeds to step S8. When the distance between the end point and the branch point Pj1 is not less than or equal to the predetermined distance d0 (step S6: N), the process proceeds to step S7.

In step S7, the lane-keeping control unit 38 causes the operation mode to transition to the hands-off mode. Subsequently, the process returns to step S2.

In step S8, the lane-keeping control unit 38 determines whether or not a travel lane in which the own vehicle 1 is currently traveling is an adjacent lane to the target lane. When the travel lane is an adjacent lane to the target lane (step S8: Y), the process proceeds to step S10. When the travel lane is not an adjacent lane to the target lane (step S8: N), the process proceeds to step S9.

In step S9, the lane-keeping control unit 38 maintains the operation mode in the lane-keeping mode in the hands-on mode. Subsequently, the process returns to step S2.

In step S10, the lane-keeping control unit 38 determines whether or not distance from the end point of the control of the automated lane change in step S2 to the start point Ps of the lane change section SL is less than or equal to d1. When the distance from the end point to the start point Ps is less than or equal to d1 (step S10: Y), the process proceeds to step S9. When the distance from the end point to the start point Ps is not less than or equal to d1 (step S10: N), the process proceeds to step S7.

(Advantageous Effects of Embodiment)

(1) A controller 20 performs first lane-keeping assistance to control an own vehicle 1 in such a way that the own vehicle 1 travels in a same lane even when a passenger is not in contact with a steering wheel and automated lane change to control the own vehicle 1 in such a way that the own vehicle 1 makes a lane change under a condition that the passenger is at least in contact with the steering wheel. The controller 20 performs processing including: selecting a target lane in which the own vehicle 1 is required to travel, based on a preset target route; and when automated lane change from a current lane, the current lane being a lane in which the own vehicle 1 is currently traveling, to the target lane includes a first automated lane change from a first lane to a second lane adjacent to the first lane and a second automated lane change from the second lane to a third lane adjacent to the second lane, performing second lane-keeping assistance to control the own vehicle 1 in such a way that the own vehicle 1 travels in a same lane under a condition that the passenger is at least in contact with the steering wheel from an end of control of the first automated lane change until a start of control of the second automated lane change.

Since because of this configuration, there is no possibility that the passenger takes the hands off the steering wheel between the first automated lane change and the second automated lane change, inconvenience due to the hands-on state being demanded for the second automated lane change immediately after the passenger takes the hands off the steering wheel can be eliminated.

(2) When the target lane is an exit lane exiting to a second road, the second road branching off from a first road in which the own vehicle 1 is currently traveling, the second automated lane change is an automated lane change from the second lane, the second lane being a lane on the first road branching off to the exit lane, to the third lane, the third lane being the exit lane, and control of the first automated lane change ends at a point a predetermined distance or more before a branch point at which the exit lane branches off from the second lane, the controller 20 may perform the first lane-keeping assistance after control of the first automated lane change ends.

Since because of this configuration, when travel distance after the control of the first automated lane change ends until the control of the second automated lane change is started is long, the first lane-keeping assistance is performed even when the passenger takes the hands off the steering wheel, a burden on the passenger can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Sensor
12 Positioning device
13 Map DB
14 In-vehicle device
15 Navigation system
16 Display device
17 Sound output device
18 Input device
19 Vehicle behavior control device
20 Controller

The invention claimed is:

1. A driving assistance method in which a controller performs automated lane change to control an own vehicle in such a way that the own vehicle makes a lane change under a condition that a passenger is at least in contact with a steering wheel, the driving assistance method causing the controller to perform processing comprising:
  selecting a target lane in which the own vehicle is required to travel, based on a preset target route; and
  in a case where an automated lane change from a current lane, the current lane being a lane in which the own vehicle is currently traveling, to the target lane includes a first automated lane change from a first lane to a second lane adjacent to the first lane and a second automated lane change from the second lane to a third lane adjacent to the second lane, starting control of the first automated lane change after performing a first lane-keeping assistance by satisfying a first predetermined condition and performing a second lane-keeping assistance from an end of control of the first automated lane change until a start of control of the second automated lane change, regardless of whether the first predetermined condition is satisfied within a time period from the end of control of the first automated lane change until the start of control of the second automated lane change,
  wherein the first lane-keeping assistance controls the own vehicle in such a way that the own vehicle travels in a same lane in a case where the first predetermined condition is satisfied regardless of whether the passenger is in contact with the steering wheel,
  wherein the second lane-keeping assistance controls the own vehicle in such a way that the own vehicle travels in the same lane in a case where the passenger is at least in contact with the steering wheel and a second predetermined condition is satisfied, and
  wherein the second predetermined condition is different than the first predetermined condition.

2. The driving assistance method according to claim 1, wherein when the target lane is an exit lane exiting to a second road, the second road branching off from a first road in which the own vehicle is currently traveling, the second automated lane change is an automated lane change from the second lane, the second lane being a lane on the first road branching off to the exit lane, to the third lane, the third lane being the exit lane, and control of the first automated lane change ends at a point a predetermined distance or more before a branch point at which the exit lane branches off from the second lane, the controller performs the first lane-keeping assistance after control of the first automated lane change ends.

3. The driving assistance method according to claim 2, wherein the second predetermined condition is at least one of:
  lane markers on both sides of the own vehicle are detected,
  the own vehicle is traveling along a center of a lane, or
  no turn signal is operated.

4. The driving assistance method according to claim 1, wherein the first predetermined condition is at least one of:
  the own vehicle is traveling on an expressway,
  a high-definition map is available, or
  GPS signals are effective.

5. A driving assistance device comprising a controller configured to perform automated lane change to control an own vehicle in such a way that the own vehicle makes a lane change under a condition that a passenger is at least in contact with a steering wheel, the controller performing processing comprising:
  selecting a target lane in which the own vehicle is required to travel, based on a preset target route; and
  in a case where an automated lane change from a current lane, the current lane being a lane in which the own vehicle is currently traveling, to the target lane includes a first automated lane change from a first lane to a second lane adjacent to the first lane and a second automated lane change from the second lane to a third lane adjacent to the second lane, starting control of the first automated lane change after performing a first lane-keeping assistance by satisfying a first predetermined condition and performing a second lane-keeping assistance from an end of control of the first automated lane change until a start of control of the second automated lane change, regardless of whether the first predetermined condition is satisfied within a time period from the end of control of the first automated lane change until the start of control of the second automated lane change, wherein the first lane-keeping assistance controls the own vehicle in such a way that the own vehicle travels in a same lane in a case where the first predetermined condition is satisfied regardless of whether the passenger is in contact with the steering wheel, wherein the second lane-keeping assistance controls the own vehicle in such a way that the own vehicle travels in the same lane in a case where the passenger is at least in contact with the steering wheel and a second predetermined condition is satisfied, and wherein the second predetermined condition is different than the first predetermined condition.

* * * * *